Sept. 22, 1970     J. F. MEACHAM     3,530,340
MULTIPLE METER PANEL
Filed Jan. 9, 1969     5 Sheets-Sheet 1
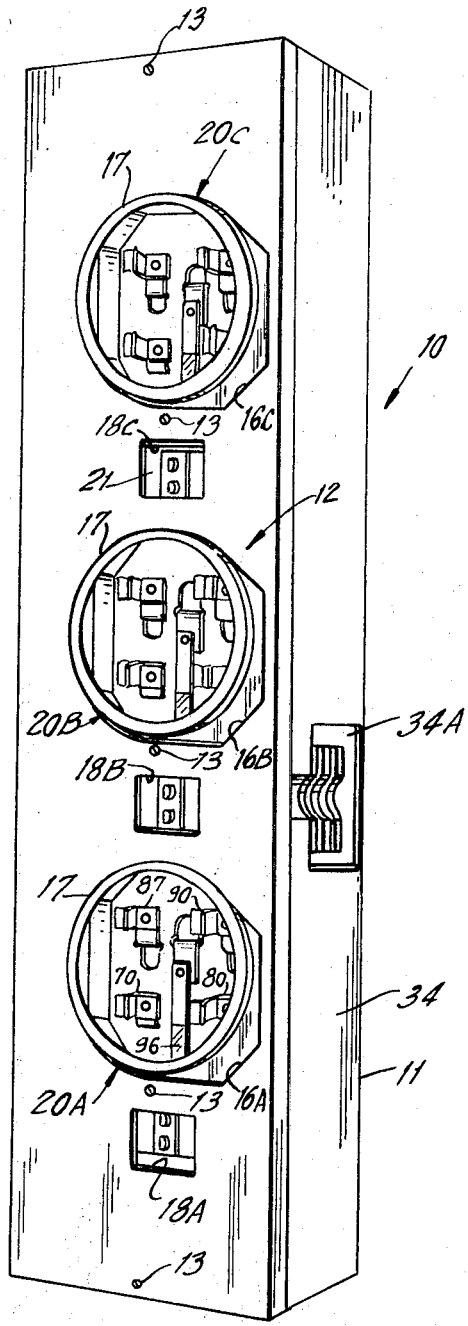
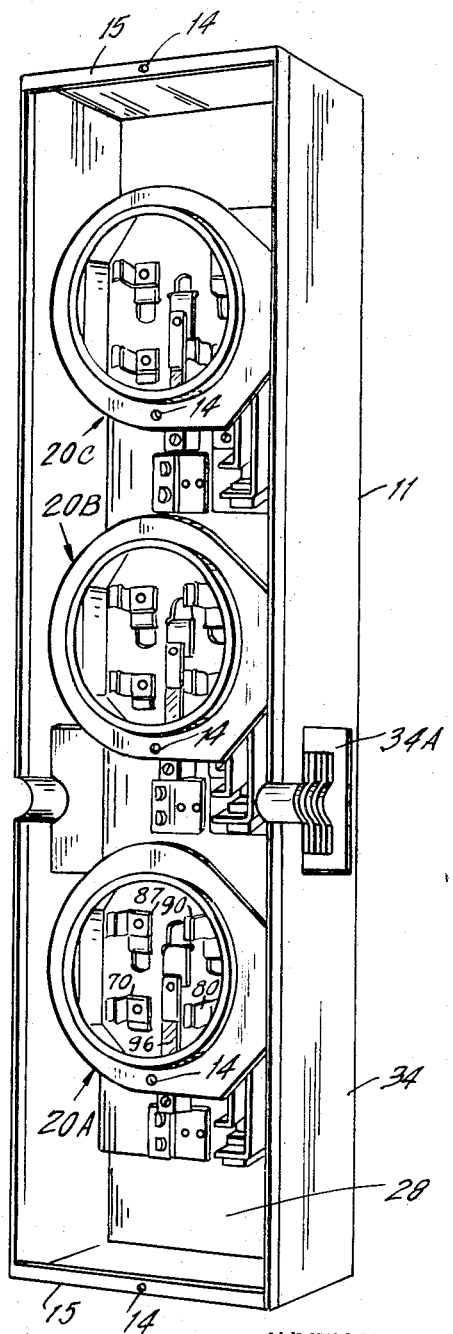
INVENTOR.
JAMES FRANK MEACHAM
BY
OSTROLENK, FABER, GERB & SOFFEN
ATTORNEY

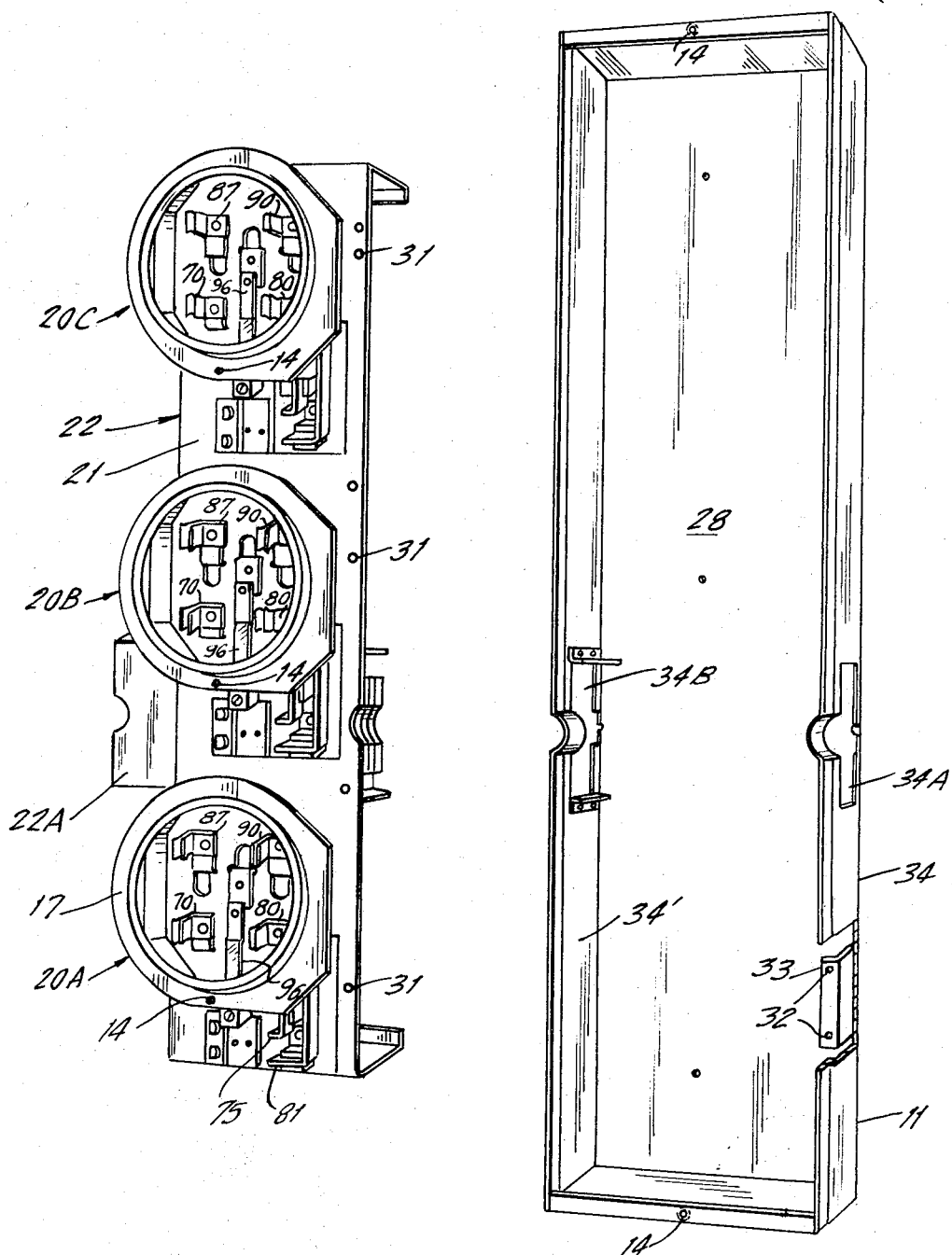

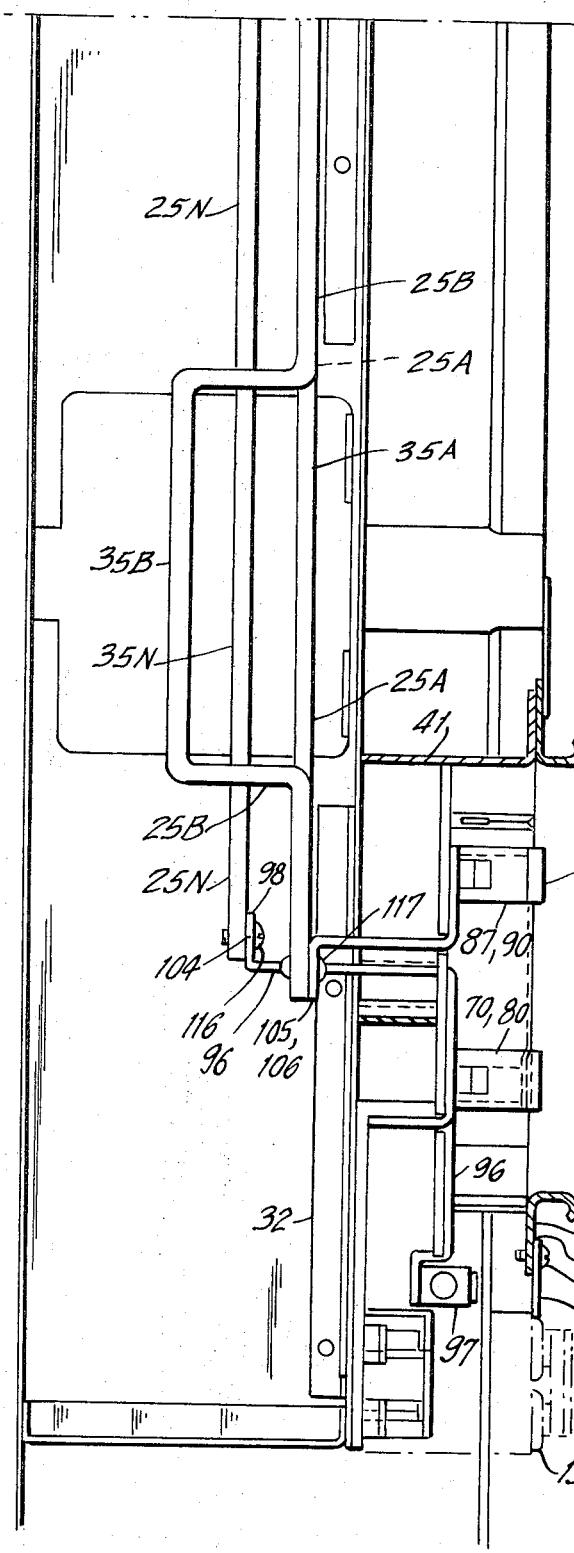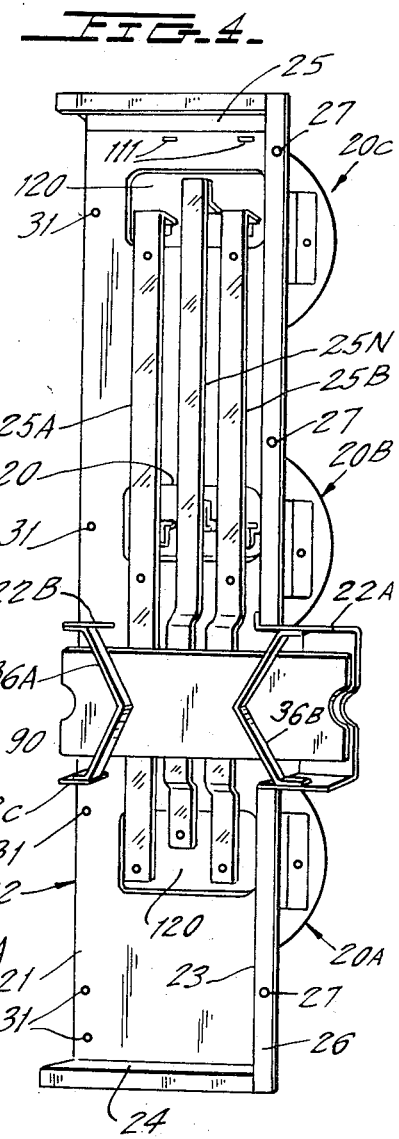

INVENTOR.
JAMES FRANK MEACHAM
BY
OSTROLENK, FABER, GERB & SOFFEN
ATTORNEYS

United States Patent Office 3,530,340
Patented Sept. 22, 1970

3,530,340
MULTIPLE METER PANEL
James Frank Meacham, Bellmawr, N.J., assignor to I-T-E Imperial Corporation, Philadelphia, Pa., a corporation of Delaware
Filed Jan. 9, 1969, Ser. No. 790,097
Int. Cl. H02b 1/10, 9/00
U.S. Cl. 317—106                                10 Claims

ABSTRACT OF THE DISCLOSURE

A multiple meter panel is provided with a single openable cover having individual openings for each of the meter sockets. Each socket is provided with a locking ring and the cover openings are large enough so that the cover may be opened without the necessity of removing any of the meters or breaking any of the meter locking seals or removing any meter locking collars. Line busing at the panel interior is enclosed in a housing disposed within the panel case so that when the cover is open all line or unmetered busing is protected. Transverse extensions of the bus bars facilitate energization thereof as well as electrical connection to bus bars of adjacent panels in multiple panel installations.

---

Prior art constructions for meter panels have been such that a locking ring was secured directly to the meter socket or the panel cover acted as a meter retainer. With either of these arrangements it was necessary to break the locking seal in order to open the panel cover or remove cover portions surrounding the socket. Ideally, breaking the locking seal should take place only when it becomes necessary to remove the meter from its socket. However, with these prior art arrangements when the seal was broken the entire cover or portions thereof could be removed to expose the line or "unmetered" busing making it possible to steal power and/or to accidentally contact energized bus. As will hereinafter be seen, these undesirable features are not present in meter panels constructed in accordance with teachings of the instant invention.

In the multiple meter panel of the instant invention the locking ring is mounted to the socket and is positioned forward of the panel cover, extending through a cover aperture that is sufficiently large to enable the cover to be removed without removing the locking collar. Inside the panel case is a housing which encloses a plurality of bus bars each having transverse extensions that are engageable through openings in the casing for connection directly to an energizing source or connection to an adjacent multiple meter panel. The meter sockets, bus bars, and housing are inserted into the case as a sub-assembly.

The meter socket includes an insulating sheet which supports the conducting elements consisting of four plug-in connectors and straps connecting two of the connectors to hot bus bars of the meter panel. There is another strap for neutral connections and two other straps extending from the remaining connections and terminating in circuit breaker engaging contact stabs. The mounting sheet forms a partition in a housing-like barrier to which the locking ring is secured.

Accordingly a primary object of the instant invention is to provide a novel construction for a multiple meter panel.

Another object is to provide a multiple meter panel in which a cover common to all meters of the panel may be opened without removing any of the locking collars.

Still another object is to provide a multiple meter panel having an interior housing within which the panel busing is enclosed.

A further object is to provide a novel meter panel construction including a locking ring.

A still further object is to provided a multiple meter panel that may readily be attached to two adjacent similar panels.

Yet another object is to provide a multiple meter panel having a sub-assembly of bus bar, meter sockets and a housing mounted within a case having a removable cover.

These objects as well as other objects of this invention will become readily apparent after reading the following description of the accompanying drawings in which:

FIG. 1 is a perspective of of a three-gang meter panel constructed in accordance with teachings of the instant invention.

FIG. 2 is a perspective of the panel of FIG. 1 with the cover removed.

FIG. 3 is a perspective of the elements of FIG. 2 with the interior sub-assembly removed from the case.

FIG. 4 is a perspective of the interior sub-assembly looking at the rear thereof.

FIG. 6 is a cross section taken through line 6—6 of FIG. 5 looking in the direction of arrows 6—6.

Figure 5:
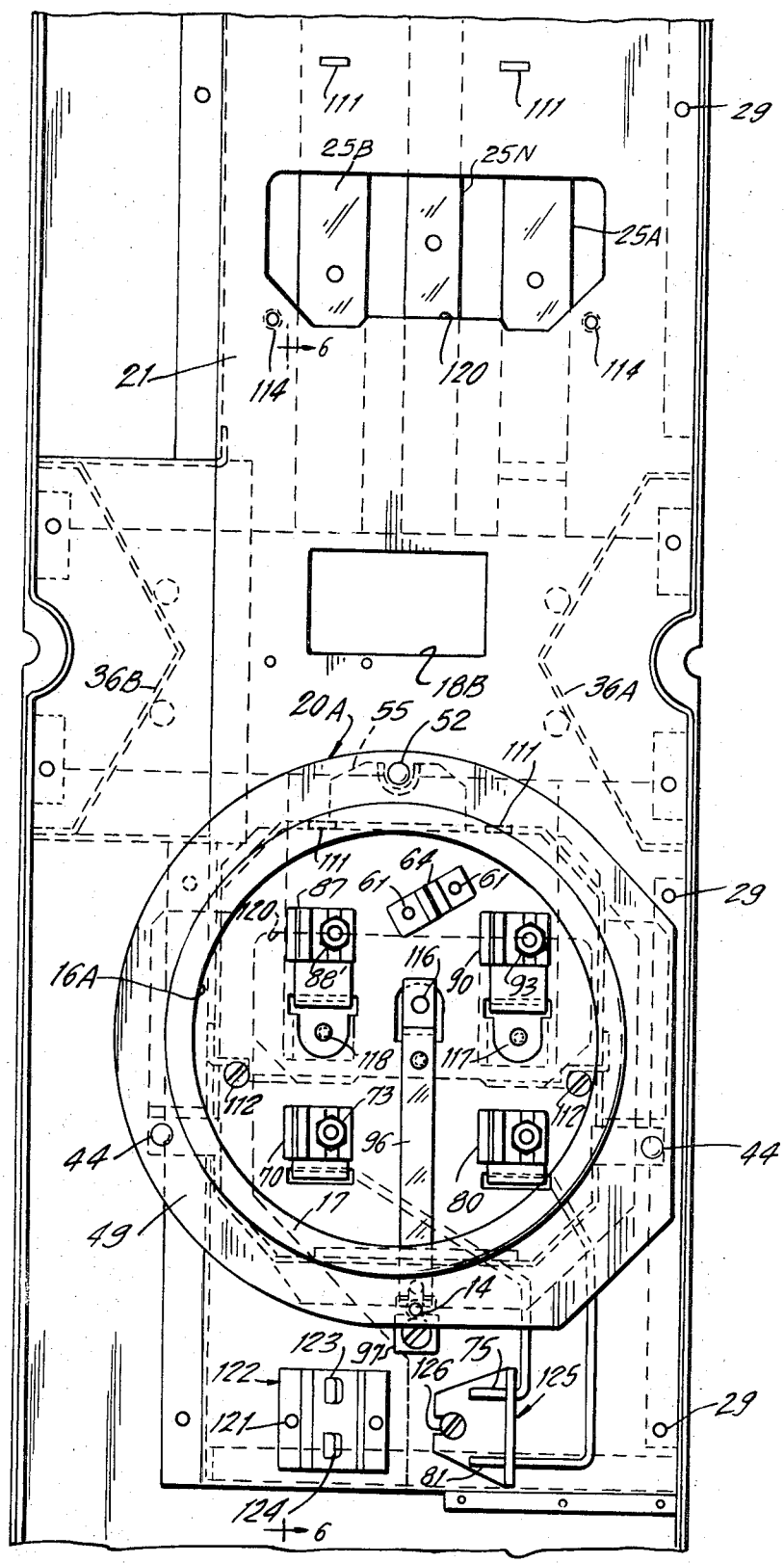
FIG. 5 is a front elevation of a single meter socket of the meter panel of FIG. 1 with fragmentary portions of the meter panel also illustrated.

Now referring to the figures. Multiple meter panel 10 includes elongated rectangular case 11 having removable cover 12. Five screws 13, received by threaded apertures 14 in ring plate 49 and inturned lips 15 at opposite ends of case 11, removably secure cover 12 to case 11. Cover 12 is provided with three generally circular apertures 16A, 16B, 16C through which the locking rings 17 of the respective meter sockets 20A, 20B, 20C extend. As will hereinafter be seen, each of the sockets 20A, 20B and 20C is of a type for mounting a conventional plug-in type watt-hour meter (not shown) or the like and locking ring 17 is adapted to cooperate with a conventional collar and lead seal (not shown) to inhibit unauthorized removal of the meter.

Rectangular apertures 18A, 18B, 18C are located below the respective generally circular apertures 16A, 16B, 16C. As will hereinafter be seen, apertures 18A, 18B, 18C are positioned so that the operating handles of conventional double pole molded case circuit breaker 130, connected in series with meter sockets 20A, 20B and 20C, extend therethrough.

In a manner to be explained in detail, each of the meter sockets 20A, 20B, 20C is mounted to forward surface 21 of elongated housing 22 disposed within case 11. Housing 22 encloses bus bars 25A, 25B and 25N and also includes side wall 23 and end walls 24, 25. Each of the end walls 24, 25 has an inwardly turned flange while outwardly turned flange 26 of side wall 23 is provided with clearance apertures 27 which receive screws securing flange 26 to the rear wall 28 of case 11. Screws 29 extending through clearance apertures 31 in housing wall 21 are received by threaded apertures in split ledge 33 secured to the internal surface of case side wall 34.

Bus bars 25A, 25B, 25N extend generally parallel to the longitudinal axis of case 11 and lie in planes parallel to housing front wall 21. Bus bar 25N is disposed in a plane slightly to the rear of the common plane for bus bars 25A and 25B. At points aligned with case side wall openings 34A and 34B bus bars 25A, 25B, 25N are provided with connecting parts 35A, 35B, 35N respectively extending at right angles to the longitudinal axes of bus bars 25A, 25B, 25N and extending from both sides thereof. At points aligned with case apertures 34A, 34B, bus bars 25B and 25N are offset to the rear so that terminal extensions 35A, 35B, 35N are arranged in a stack with terminal extension 35N between terminal extensions 35A and 35B. In the space between housing wall 23 and case wall 34' bus bar terminal extensions 35A, 35B, 35N are enclosed by transverse U-shaped extension 22A of housing 22.

As will hereinafter be seen, securement of meter socket elements to bus bars 25A, 25B, 25N maintains such bus bars in their operative positions spaced from one another as well as from the walls of housing 22. V-shaped insulators 36A, 36B (FIG. 4), having bus bar receiving slits therein, maintain bus bar terminal extensions 35A, 35B, 35N in spaced parallel relationship and spaced from housing 22. Slot-like formations in housing extension 22A position insulator 36B while similar slot-like formations in internal brackets 22B, 22C of housing 22 position insulator 36A. It is noted that the unused slots in insulators 36A, 36B are provided for modifications requiring an additional bus bar.

It is noted that both ends of each of the bus bar terminal extensions 35A, 35B, 35N are notched to facilitate the connection of a joint stack which will electrically connect meter panel 10 to an identical meter panel positioned alongside of meter panel 10 or will connect meter panel 10 directly to a source of electric power. Joint stacks suitable for meter panel 10 are of a type illustrated in FIG. 8 of U.S. Pat. No. 3,104,276 issued Sept. 17, 1963, J. B. Cataldo et al. on a Through-Bolt Joint For Bus Duct.

Figure 7:
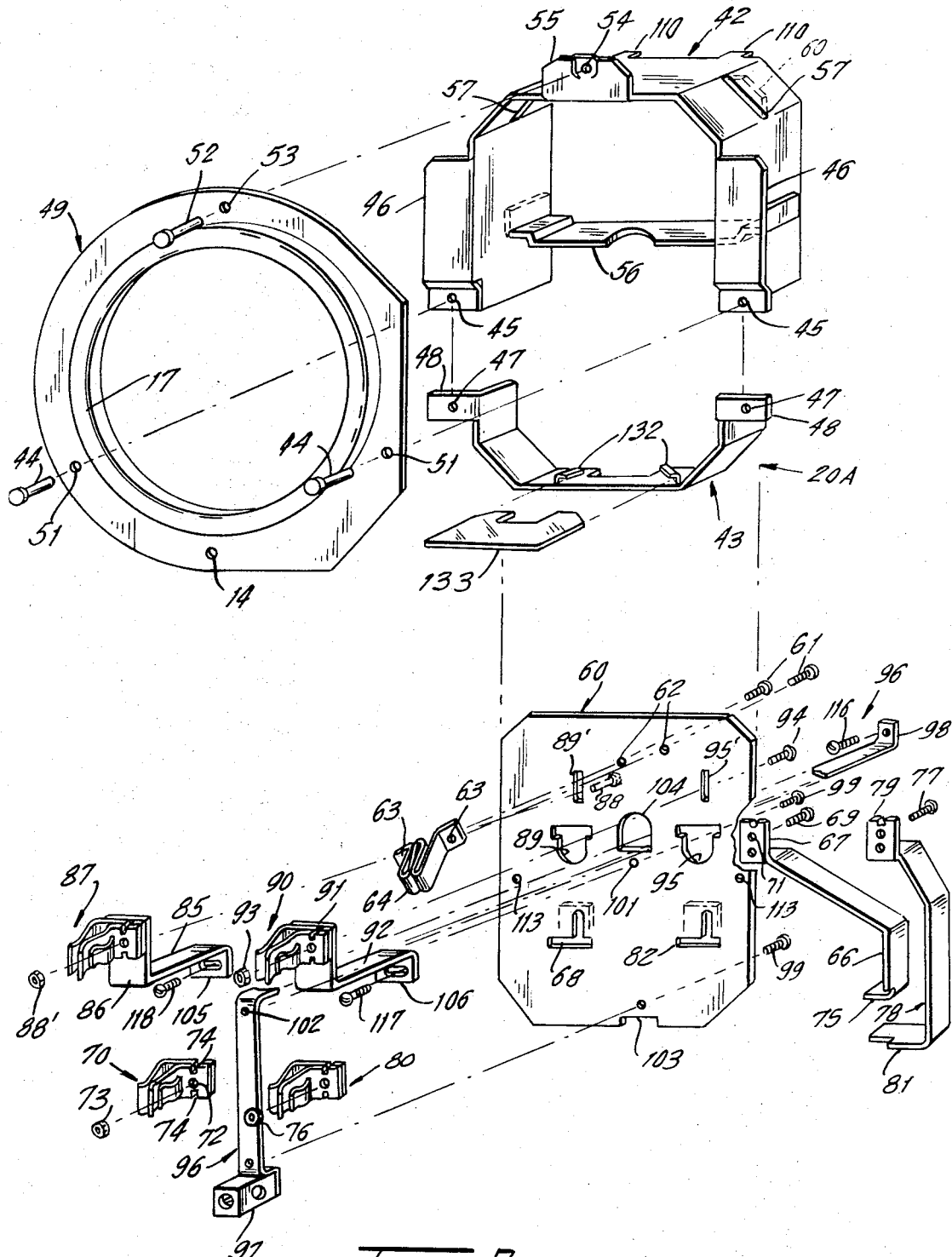
FIG. 7 is an exploded perspective of the meter socket.

Since meter sockets 20A, 20B and 20C are identical, only the construction of socket 20A will be described in detail with particular reference being made to FIGS. 5, 6 and 7. Meter socket 20A includes enclosure 41 formed of modified U-shaped elements 42 and 43. Rivets 44 extend through clearance apertures 45 in ears 46 extending in opposite direction but outward from the forward edge of member 42 and also extend through clearance apertures 47 in ears 48 turned out in opposite directions from the upper edge of member 43 to fixedly secure elements 42, 43 together.

The upper edges of elements 42, 43 lie in a common plane and support ring plate 49 having a circular aperture with a turned out neck portion constituting locking ring 17. Rivets 44 also pass through clearance apertures 51 in plate 49 to secure the latter to enclosure 41. Additional securement is provided by rivet 52 extending through aperture 53 in plate 49 and aperture 54 in ear 55 turned out from the upper edge of member 42.

The walls of member 43 are shorter than the walls of member 42. At a point to the rear of member 43 transverse barrier 56 is connected between the arms of member 42. Insulating support sheet 60 is positioned immediately to the rear of member 43 and immediately forward of barrier 56, with two adjacent corners of sheet 60 extending through positioning slots 57 in member 42. Insulating neutral barrier sheet 133 is retained to enclosure barrier 41 by formations struck therefrom and positioning sheet 133 to the rear of plate 49 and forward of sheet 60.

Screws 61 extend through apertures 62 in insulator 60 and are received by threaded apertures 63 of retaining spring clip 64 to secure the latter to the forward surface of insulator 60. In a manner well known to the art spring clip 64 acts as a retainer to hold a meter mounted to socket 20A in an "inoperative" position or that position in which the meter terminals do not engage the socket terminals.

Load strap 66 is for the most part positioned to the rear of insulator 60. However, offset portion 67 at one end of strap 66 extends through modified T-shaped aperture 68 to the forward surface of insulator 60. Screw 69 also extends through threaded aperture 71 in load strap 66 and a clearance aperture 72 in plug-in terminals 70, and is threadedly secured by nut 73. Down-turned ears 74 of terminal 70 are received in suitable cut-outs at opposite sides of aperture 71 to prevent rotation of terminal 70 on load strap end 67.

The other end 75 of strap 66 provides stab-type terminal to be engaged by a plug-in terminal of a conventional molded case circuit breaker 130. The other load terminal spring clip 80 is similarly mounted to end 79 of load strap 78 extending through plate opening 82, with screw 77 and nut 76 securing strap 78 and load terminal 80 to insulating sheet 60. The other end of strap 78 is provided with circuit breaker engaging stab 81 and is positioned in a plane spaced from and parallel to the plane of stab 75.

Line strap 85 extends through insulator aperture 89 and is provided with offset portion 86 at one end thereof to position spring clip terminal 87. Screw 88 extends through aperture 89' in insulating sheet 60 as well as through apertures in line strap 85 and line terminal 87 and is received by nut 88' to secure these elements together and to secure them to insulating sheet 60. The other end of strap 85 is provided with bus bar connecting portion 105. Similarly, the other spring clip line terminal 90 is secured to end 91 of line strap 92 by nut 93 and screw 94 with the latter extending through insulator aperture 95'. Line strap 92 extends through insulator aperture 95. The other end of strap 92 is provided with bus bar connecting portion 106.

The central section of neutral strap 96 lies along the forward surface of insulating sheet 60. Wire grip 97 is connected to one end of strap 96 while the other end of strap 96 is rearwardly offset terminating in terminal portion 98. Screw 99 extends from the rear of insulator 60 through aperture 101 thereof and is received by the threaded aperture 102 in neutral strap 96 to secure the latter to insulator 60. Insulator notch 103 and insulator aperture 104 adjacent to aperture 101 serve to operatively position neutral strap 96.

Tabs 110 extending rearward from enclosure member 42 extend into complementary slots 111 in housing wall 21 to prevent movement of sockets 20a along the surface of wall 21. Screws 112 extend through clearance apertures 113 in insulating sheet 60 and are received by threaded apertures 114 in housing wall 21 to secure socket 20A to housing 22.

Straps 85, 92, 96 extend into housing 22 through aperture 120 in wall 21. Screw 116 in alignment with aperture 104 extends through a clearance aperture in terminal portion 98 of neutral strap 96 and is received by a threaded aperture in neutral bus bar 25N to electrically connect terminal strap 96 to neutral bar 25N. Similarly screws 117, 118 in alignment with apertures 75 and 89, respectively, extend through clearance apertures in the respective terminal portions 106 and 105 to electrically connect line strap 85 to bus bar 25B and line strap 92 to bus bar 25A. Two rivets 121 secure mounting plate 122 to the forward surface of housing wall 21 in the vicinity of rectangular aperture 18A. At a point intermediate rivets 121 plate 122 is forwardly offset and portions are struck out to form hooks 123, 124 which are operatively positioned with respect to stabs 75 and 81 to act as mechanical securing points about which molded case circuit breaker 130 is pivoted into contact with stabs 75 and 81. Insulating bracket 125, secured by screw 126 to the forward surface of housing wall 21, maintains the proper operative spacing between stabs 75 and 81 and also serves to insulate such stabs from housing 22.

As seen in FIG. 6, when cover 12 is closed the inner surface thereof lies against socket plate 49 and engages edge portions of circuit breaker 130 to prevent removal thereof. It is again noted that cover aperture 16A is larger than meter locking ring 17 and the clearance therebetween is sufficient so that cover 12 may be removed without first removing the locking collar (not shown) or seal (not shown) which locks a meter to meter socket 20A.

Thus it is seen that the instant invention provides a simplified construction for a meter socket and also provides an improved multiple meter panel having a single cover that may be removed without the necessity of removing any of the meter locking collars. Further, a housing within the panel case encloses the panel bus bars to substantially reduce the possibility of contacting live parts when the cover is open. To simplify assembly the bus bar, meter sockets, and housing are secured together as a sub-assembly insertable into the base as a unitary structure.

While the meter sockets and busing arrangement shown and described are for a single phase installation, it should be obvious to those skilled in the art that the teachings of this invention are also applicable to three phase busing and three phase meter sockets.

Although the invention has been described above with respect to its preferred embodiments, it will be understood that many variations and modifications will be obvious to those skilled in the art. It is preferred therefore that the scope of the invention be limited not by the specific disclosure herein but only by the appended claims.

What is claimed is:

1. A meter mounting device including a case having an openable front cover, a plurality of bus elements operatively supported within said case, a socket adapted to mount a meter and having terminals electrically connected to said bus elements, said socket including a locking ring, said socket mounted within said case to the rear of said cover with said ring extending through a socket opening in said cover and positioned forward thereof, said opening being larger than said ring by an amount sufficient to permit opening of said cover without removal of a seal or a locking collar engaging said ring and locking a meter to said socket.

2. A meter mounting device as set forth in claim 1 in which there is a housing within said case, said socket positioned externally of said housing, said bus elements disposed within said housing.

3. A meter mounting device as set forth in claim 1 in which there are a plurality of additional sockets each mounted within said case and having terminals electrically connected to said bus elements, each of said sockets having substantially identical constructions, said cover having a plurality of additional socket openings, one for each of said additional sockets, said additional sockets having their locking rings positioned forward of said cover, all of said openings and all of said rings being relatively proportioned to permit opening of said cover without dismounting a meter or a locking collar from any of said sockets.

4. A meter mounting device as set forth in claim 3, in which each of said sockets includes an enclosure barrier, an insulating sheet supported by said enclosure, a ring plate secured to said enclosure and positioned forward of said sheet, a plurality of plug-in terminals secured to said sheet and positioned forward thereof and to the rear of said plate, a plurality of conducting straps extending from said plug-in terminals to the rear of said sheet, some of said straps terminating in bus element connecting portions and others of said straps terminating in circuit breaker energizing terminals.

5. A meter mounting device as set forth in claim 3 in which there is a housing within said case, said bus elements disposed within said housing, all of said sockets positioned externally of said housing, all of said sockets including conducting straps extending into said housing with some of said straps connecting said terminals to said bus elements.

6. A meter mounting device as set forth in claim 5 in which said housing, said bus elements, and said sockets are secured together as a sub-assembly removable from said case as a unitary structure.

7. A meter mounting device as set forth in claim 5 in which each of said sockets includes an enclosure barrier, an insulating sheet supported by said enclosure, a ring plate secured to said enclosure and positioned forward of said sheet, a plurality of plug-in terminals secured to said sheet and positioned forward thereof and to the rear of said plate, said conducting straps extending from said plug-in terminals to the rear of said sheet, said some of said straps terminating in bus element connecting portions and others of said straps terminating in circuit breaker energizing terminals.

8. A meter mounting device as set forth in claim 5 in which both said case and said housing are elongated, said sockets disposed in a single row extending parallel to the longitudinal axes of said case and said housing.

9. A meter mounting device as set forth in claim 8 in which said case is provided with aligned apertures in opposite sides thereof, each of said bus elements being elongated and extending generally parallel to said longitudinal axes, each of said bus elements having transverse terminal extensions aligned with said apertures and extending from opposite sides of said bus elements toward apertures.

10. A meter mounting device as set forth in claim 3, in which said cover is a unitary structure, a housing within said case, said bus elements disposed within said housing, said sockets mounted externally of said housing and including a plurality of conducting straps extending rearward of said socket, some of said straps terminating in bus element connecting portions and others of said straps terminating in circuit breaker energizing terminals, a plurality of switch devices connected to said circuit breaker energizing terminals with an individual one of said switch devices positioned adjacent to the particular one of said sockets to which the individual switch device is electrically connected, said switch devices mounted to said housing and disposed within said case, each of said switch devices having an operating member extending through an opening in said cover to a position forward thereof.

References Cited

UNITED STATES PATENTS 2,991,398  7/1961  Strong _____ 317—109
3,458,768  7/1969  Schubert _____ 317—108

LARAMIE E. ASKIN, Primary Examiner

G. P. TOLIN, Assistant Examiner

U.S. Cl. X.R.

317—108

PO-1050
(5/69)

UNITED STATES PATENT OFFICE
CERTIFICATE OF CORRECTION

Patent No. 3,530,340        Dated 5 June 1972

Inventor(s) James Frank Meacham

It is certified that error appears in the above-identified patent and that said Letters Patent are hereby corrected as shown below:

Column 4, line 52, change "75" to -- 95 --.

Signed and sealed this 19th day of September 1972.

(SEAL)
Attest:

EDWARD M.FLETCHER,JR.        ROBERT GOTTSCHALK
Attesting Officer              Commissioner of Patents